(12) United States Patent
Seo et al.

(10) Patent No.: US 12,162,684 B2
(45) Date of Patent: *Dec. 10, 2024

(54) SYSTEMS AND METHODS FOR OBJECT STORAGE AND RETRIEVAL

(71) Applicant: Walmart Apollo, LLC, Bentonville, AR (US)

(72) Inventors: Frank Seo, Bentonville, AR (US); Alexander Bell, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/226,680

(22) Filed: Jul. 26, 2023

(65) Prior Publication Data

US 2023/0373721 A1 Nov. 23, 2023

Related U.S. Application Data

(63) Continuation of application No. 17/568,264, filed on Jan. 4, 2022, now Pat. No. 11,753,244, which is a
(Continued)

(51) Int. Cl.
*G07C 9/00* (2020.01)
*B65G 1/137* (2006.01)
*G07F 11/62* (2006.01)

(52) U.S. Cl.
CPC ....... *B65G 1/1371* (2013.01); *G07C 9/00174* (2013.01); *G07C 9/00571* (2013.01);
(Continued)

(58) Field of Classification Search
CPC .............. B65G 1/1371; B65G 2209/02; G07C 9/00174; G07C 9/00571; G07C 9/00896;
(Continued)

(56) References Cited

U.S. PATENT DOCUMENTS 10,043,151 B1 * 8/2018 Zhu ................. G06K 19/06037
10,482,420 B1 * 11/2019 Brooks .............. G06Q 10/0836
(Continued)

FOREIGN PATENT DOCUMENTS

WO 2020112552 6/2020

OTHER PUBLICATIONS

International Search Report and Written Opinion from related International Patent Application No. PCT/US2019/062817 issued Jan. 30, 2020.
(Continued)

*Primary Examiner* — Thomas Randazzo
(74) *Attorney, Agent, or Firm* — Fitch, Even, Tabin & Flannery LLP

(57) ABSTRACT

Described in detail herein are object storage and retrieval systems and methods. A storage receptacle can be configured to receive an input from an electronic device including a decoded identifier from a unique optical machine-readable element associated with one or more physical objects, via an input device, and cause the one or more physical objects to be available via at least one opening of the storage receptacle.

20 Claims, 9 Drawing Sheets

Related U.S. Application Data continuation of application No. 16/692,789, filed on Nov. 22, 2019, now abandoned.

(60) Provisional application No. 62/773,456, filed on Nov. 30, 2018.

(52) U.S. Cl.
CPC ..... *G07C 9/00896* (2013.01); *G07C 9/00912* (2013.01); *G07F 11/62* (2013.01); *B65G 2209/02* (2013.01)

(58) Field of Classification Search
CPC ..... G07C 9/00912; G07F 11/62; G06Q 10/08; G06Q 10/087; G06Q 30/06
See application file for complete search history.

(56) References Cited

U.S. PATENT DOCUMENTS

| | | | |
|---|---|---|---|
| 11,753,244 B2* | 9/2023 | Seo | G07C 9/00571 700/215 |
| 2010/0316470 A1 | 12/2010 | Lert | |
| 2015/0266672 A1 | 9/2015 | Lert | |
| 2017/0098378 A1 | 4/2017 | Soundararajan | |
| 2018/0174101 A1 | 6/2018 | Mattingly | |
| 2018/0231973 A1 | 8/2018 | Mattingly | |
| 2018/0300679 A1* | 10/2018 | Mahmood | G06Q 10/0836 |
| 2019/0344965 A1* | 11/2019 | Wilkinson | G07F 11/42 |
| 2019/0370744 A1* | 12/2019 | Fee | G07C 9/38 |
| 2020/0017299 A1* | 1/2020 | Durkee | H04W 48/08 |
| 2020/0066086 A1* | 2/2020 | Fee | G07F 9/001 |
| 2020/0172337 A1* | 6/2020 | Wilkinson | B65G 1/06 |
| 2020/0172338 A1 | 6/2020 | Seo | |
| 2020/0239229 A1* | 7/2020 | Tovey | G07F 11/32 |
| 2020/0408028 A1* | 12/2020 | Schmider | E05G 1/08 |
| 2021/0049846 A1* | 2/2021 | Kashi | G07C 9/00912 |
| 2021/0074100 A1* | 3/2021 | Kashi | G07C 9/00912 |
| 2021/0142277 A1* | 5/2021 | Fee | G07C 9/00571 |
| 2022/0127077 A1 | 4/2022 | Seo | |

OTHER PUBLICATIONS

USPTO; U.S. Appl. No. 16/692,789; Notice of Allowance mailed Oct. 4, 2021.
USPTO; U.S. Appl. No. 17/568,264; Notice of Allowance and Fees Due (PTOL-85) mailed Apr. 26, 2023; (pp. 1-9).
Wehner et al. "An integrated design and fabrication strategy for entirely soft, autonomous robots." In: Nature. Aug. 24, 2016 (Aug. 24, 2016) Retrieved on Jan. 12, 2020 (Jan. 12, 2020) from <https:lldash.harvard.edu/ bitstreamlhandle/1/29956021/Nature_autonomous_soft_robots_manuscript.pdf?sequence=4&isAllowed=y> entire document.

* cited by examiner

SYSTEMS AND METHODS FOR OBJECT STORAGE AND RETRIEVAL

CROSS-REFERENCE TO RELATED APPLICATION(S)

This application is a continuation of U.S. application Ser. No. 17/568,264 filed Jan. 4, 2022, which is a continuation of U.S. application Ser. No. 16/692,789 filed Nov. 22, 2019, which claims the benefit of U.S. Provisional Application No. 62/773,456 filed Nov. 30, 2018, all of which are incorporated herein by reference in their entirety.

BACKGROUND

Inventory can be stored in various locations in a facility. Typically, inventory can be stored in a back room, on display racks and shelves on a sales floor, and in other locations. When inventory is not stored on the sales floor, an employee of the facility is typically required to retrieve the inventory and provide it to a customer.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
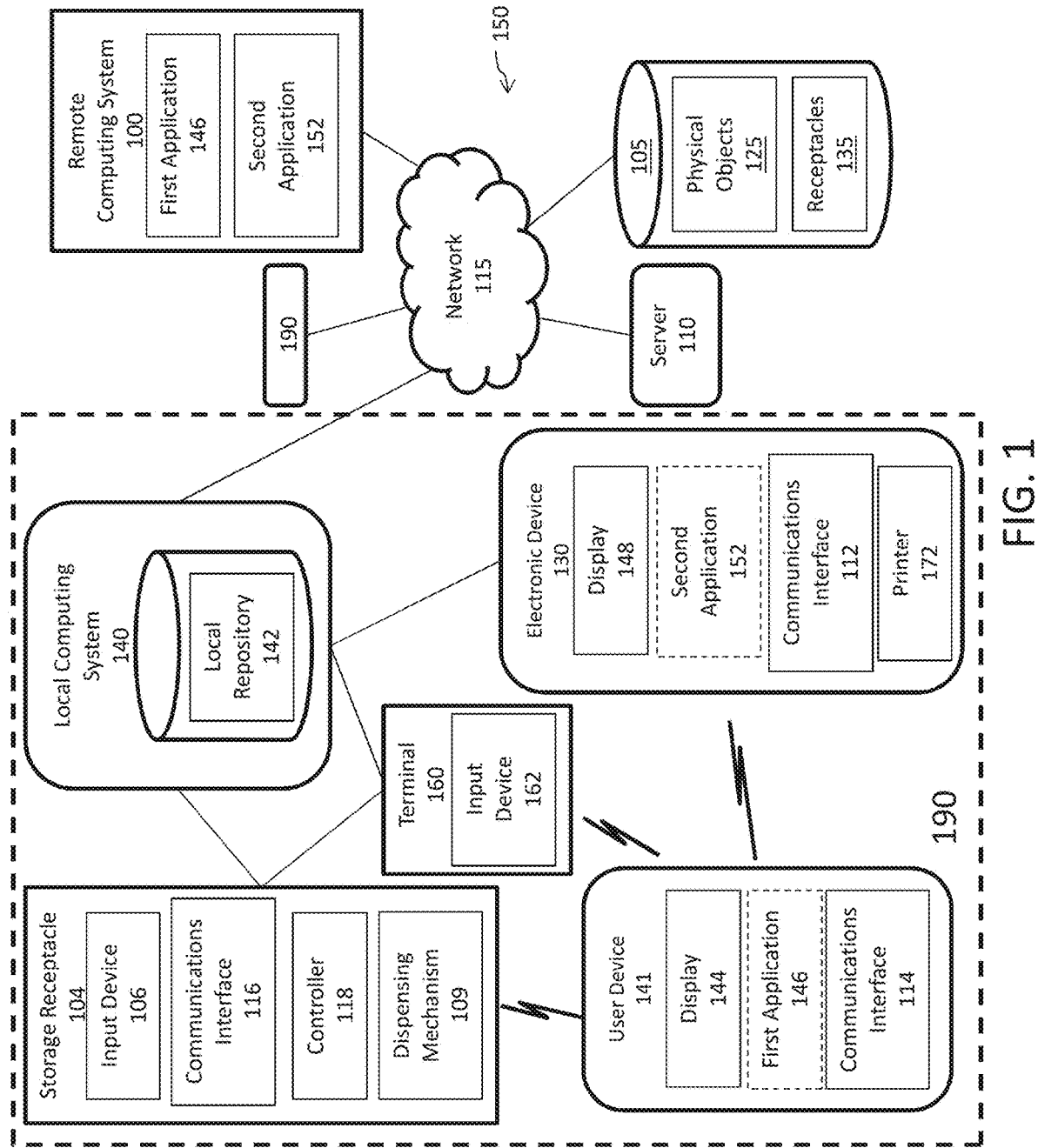
FIG. 1 is a block diagram depicting a facility including electronic devices in accordance with an exemplary embodiment.

Described in detail herein are object storage and retrieval systems and methods. In one embodiment, an autonomous storage and retrieval system can interface with one or more user devices configured to execute an instance of a first application, and electronic devices disposed throughout a facility. Each electronic device can include an interactive display and a communications interface. The electronic devices can be configured to execute an instance of a second application to receive a first input associated with one or more physical objects associated with a section of the facility within a proximate distance of the at least one electronic device, generate a unique optical machine-readable element encoded with an identifier associated with the one or more physical objects, display the unique optical machine-readable element on the interactive display, communicatively pair with at least one user device of the one or more user devices, via the first and second applications, and transmit the unique optical machine-readable element to the at least user device.

In one embodiment, one or more terminals can be disposed in the facility. The terminals can be in communication with the one or more storage receptacles. A terminal can be configured to receive a third input from the at least one user device including the machine-readable element encoded with the identifier associated with the one or more machine-readable elements, determine the one or more physical objects are disposed in the storage receptacle, and generate a new optical machine-readable element associated with requesting retrieval of the one or more physical objects. In one embodiment, the terminal can transmit the optical machine-readable element to the user device or print the optical machine-readable element.

The system can further include one or more autonomous storage receptacles. Each storage receptacles can include an input device, an interior volume, at least one opening, and can be configured to store physical objects within the interior volume. A storage receptacle can be configured to receive a second input from the user device including the identifier from the optical machine-readable element associated with the one or more physical objects, via the input device, confirm the one or more physical objects are stored within the interior volume of the at least one storage receptacle, and dispense the one or more physical objects via the at least one opening of the at least one storage receptacle. In one embodiment, the second input can include the optical machine-readable element transmitted to the user device by the electronic device. In another embodiment, the second input can include the new optical machine-readable element generated by the terminal. In one embodiment, the terminal can communicate with the storage receptacle to authorize the storage receptacle to dispense the physical object.

In one embodiment, the input device of the storage receptacle can be an optical scanner configured to scan and decode the machine-readable element rendered on a display of the at least one user device. The communications interface of the storage receptacle can be a Near Field Communications (NFC) device.

In one embodiment, the system can further include a local computing system associated with the facility and a remote computing system. The local computing system can include a first database and the remote computing system can include a second database. In response to transmitting the unique machine-readable element to the at least user device from the electronic device, the electronic device can receive a fourth input associated with delivering the one or more physical objects to a specified location. In response to the electronic device receiving the fourth input, the electronic device can be configured to generate a communications bridge between the at least one electronic device and the remote computing system. The remote computing system can be configured to update the second database. In response to the dispensing of the one or more physical objects the local computing system can be configured to update the first database. Each electronic device disposed in the facility is associated with a different section of the facility and/or a different physical object designated to be stored in the facility.

FIG. 1 illustrates an exemplary autonomous object storage and retrieval system 150 in accordance with an exemplary embodiment. The autonomous object storage and retrieval system 150 can include one or more databases 105, one or more servers 110, one or more storage receptacles 104, one or more terminals 160, one or more electronic devices 130, one or more local computing systems 140, and one or more remote computing systems 100. The storage receptacles 104, terminals 160, electronic devices 130 can be disposed in each facility 190. One or more user devices 141 can be configured and/or programmed to communicate with and/or interact with the one or more servers 110, the one or more storage receptacles 104, the one or more terminals 160, the one or more electronic devices 130, the one or more local computing systems 140, and/or the one or more remote computing systems 100. In an example embodiment, each facility 190 can include at least the one or more storage receptacles 104, the one or more terminals 160, the one or more electronic devices 130, and the one or more local computing systems 140. The local computing system 140 can include a local repository 142 configured to store information associated with the facility 190 in which the local computing system 140 is disposed and information associated with the physical objects disposed in the facility 190. The user device 141 can include an interactive display 144 and a communications interface 114. The user device 141 can execute a first application 146. The electronic device 131 can include an interactive display 148 and a communications interface 112. The electronic device 131 can execute an instance of the second application 152. The communications interfaces 112 and 114 can be near-field communication (NFC) devices. The storage receptacle 104 can include an input device 106, a communications interface 116, a controller 118, and a dispensing mechanism 109. In one embodiment, the remote computing system 100 can host the first and second application 146 and 152. The terminal 160 can include an input device 162.

In an example embodiment, one or more portions of the communications network 115 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 110 includes one or more computers or processors configured to communicate with the remote computing system 100, the local computing systems 140, and the databases 105, storage receptacle 104, via a communications network 115. The server 110 hosts one or more applications configured to interact with one or more components of the remote computing system 100 and/or facilitates access to the content of the databases 105. The databases 105 may store information/data, as described herein. For example, the databases 105 can include physical objects database 125 and receptacles database 135. The physical objects database 125 can store information associated with physical objects disposed in each of the facilities. The receptacles database 135 can store information associated with the storage receptacles location and physical object disposed in the storage receptacles. The databases 105 can be located at one or more geographically distributed locations from the remote computing system 100. Alternatively, the databases 105 can be located at the same geographically as the remote computing system 100.

In one embodiment, a user can operate a user device 141 in the facility 190. The user device 141 can execute an instance of the first application 146. A user device 141 can receive input or can scan various physical objects disposed in the facility. Information associated with each of the physical objects can be rendered on the interactive display 144, via the first application 146. The user may further interface with an electronic device 130 disposed in a section of a facility to request to retrieve a physical object from a storage receptacle 104, not disposed in the respective section of the facility.

The electronic device 130 can receive input associated with the requested physical object. The electronic device 130 can query, via the second application 152, the local repository 142 to retrieve information associated with the requested physical object. The information can include a quantity of the requested physical object stored in the storage receptacle, and information associated with the storage receptacle in which the requested physical object is disposed. The electronic device 130 can render the information on the interactive display 148, via the second application 152. The electronic device 130 can further generate an optical machine-readable element, such as a barcode or a QR code, encoded with an identifier associated with the requested physical object. The electronic device 130 can render the optical machine-readable element on the interactive display 148, via the second application 152.

In one embodiment, the user device can capture an image or scan the displayed optical machine-readable element. The first application 146 executing on the user device 141 can process and/or reproduce the optical machine-readable element which can be rendered on the display of the user device 141.

In one embodiment, the second application 152 of the electronic device 130 can receive a request to commutatively pair with of the user device 141 from the first application 146 of the user device 141. The electronic device 130 can use the communications interface 112 to pair with the user device 141. The user device 141 can use the communications interface 114 to pair with the electronic device 130. In response to pairing with the user device 141, the electronic device 130 can transmit the information associated with the requested physical object along with the optical machine-readable element. In response to receiving the information associated with the requested physical object along with the optical machine-readable element, the user device 141 can render the information associated with the requested physical object along with the optical machine-readable element on the interactive display 144, using the first application 146.

In one embodiment, the electronic device 130 can receive a request to pair with the user device 141 prior to receiving a request for the physical object. Subsequently to pairing with the user device, the user device 141 can interface with the electronic device 130 using the facility application to request the physical object to be retrieved from the storage receptacle 104 and to receive the information associated with the requested physical object along with the optical machine-readable element associated with the requested physical object.

In one embodiment, the electronic device 130 can include a printer 172. The electronic device 130 can instruct the printer 172 to print an image of the optical machine-readable element of the requested physical object.

The terminal 160 can be a point-of-sale system configured to scan machine-readable elements of physical objects to facilitate a transaction with a user. In one embodiment, the terminal 160 can be a self-checkout POS and the user can interface with the terminal using the input device 162 of the terminal 160. In one embodiment, the terminal 160 can be a cashier-operated terminal and a cashier can interface with the terminal 160 using the input device 162. The input device 162 can receive information associated with each physical objects including information from any physical objects retrieved from the facility and transported to the terminal 160, information for any physical objects which were scanned by the user device 141 or for which the user device 141 received input, and/or any optical machine-readable elements for physical objects to be retrieved from the storage receptacle. For the machine-readable elements to be retrieved from the storage receptacle after processing by the terminal 160, the input device 162 can either scan the optical machine-readable element rendered on the interactive display 144 of the user device 141 or receive manual input associated with the identifier encoded in the optical machine-readable element. The terminal 160 can query the local repository 142 to determine which storage receptacle 104 is storing the requested physical object. After the machine readable elements of the physical objects transported to the terminal 160 and the machine-readable elements rendered on the display of the user device 141 have been scanned and/or processed by the terminal 160, the terminal 160 can generate a receipt, which can include a new optical machine-readable element corresponding to the transaction at the terminal 160. The new machine-readable element can be encoded with a transaction or order number and can be used to look-up the physical objects that were part of the transaction. In one embodiment, the terminal can print the receipt with the new machine-readable element or can transmit receipt to the user device directly (e.g., via a direct communication link with the user device) or indirectly (e.g., via e-mail, text message, adding it to an account associated with the user of the user device).

The user can interface with the storage receptacle 104 using the input device 106 of the storage receptacle 104. The input device 106 can either scan the new optical machine-readable element which can be rendered on the interactive display 144 of the user device 141, rendered on the printed receipt, or can receive manual input associated with the identifier encoded in the new optical machine-readable element. The storage receptacle can interface with the local and/or remote computing systems using the order number encoded in the new machine-readable element and the local and/or remote computing systems can retrieve information about the transaction using the order number to identify a physical object from the set of physical objects in the order which is stored in the storage receptacle and which has not yet been retrieved by the user. The local and/or remote computing system can provide the storage receptacle with information about the physical object to be retrieved and can provide authorization to the storage receptacle to dispense the physical object. The controller 118 can determine the location of the physical object within the interior volume of the storage receptacle 104. The controller 118 can control the operation of the dispensing mechanism 109 to pick-up, transport, and dispense the physical object through opening of the storage receptacle.

In one embodiment, the electronic device 130 and/or terminal 160 can be in communication with the remote and local computing system. Each time a physical object is retrieved from the storage receptacle 104 or is requested to be retrieved from the storage receptacle, the remote computing system can update the physical objects database 125 and the local computing system can update the local repository 142.

In embodiment, the electronic device 130 can determine the physical object is unavailable in the facility. The electronic device 130 can provide a selection for the physical object to be delivered to a specified location. The electronic device 130 can receive input associated with the specified location. The electronic device 130 can transmit the request to deliver the requested physical object to the remote computing system, for fulfillment.

In one embodiment, the electronic device 130 and/or terminal 160 can transmit an optical machine-readable element for retrieving the physical object from the storage receptacle 104. The user device 141 can store the optical machine-readable element in memory. The user can retrieve the optical machine-readable element stored in the user device 141 to retrieve the physical object from the storage receptacle without interfacing with the terminal 160.

In one embodiment, the terminal 160 can communicate the identifier of the physical object to the communications interface 116 of the appropriate storage receptacle storing requested physical object, to authorize the storage receptacle 104 to dispense the physical object so that the storage receptacle does not interface with the local and/or remote computing system to identify the physical object to be dispensed and obtain authorization to dispense the physical object.

As a non-limiting example, the autonomous object storage and retrieval system 150 can be implemented in a retail store environment. The users can be customers in the retail store. The physical objects can be items for sale in the retail store. The terminal 160 can be embodied by a Point of Sale (POS) terminal. The retail store can store items in storage receptacles, which are prone to shrinkage/loss or which cannot be stored on the sales floor. The customer can use their user device 400 to checkout at the POS terminal for each of the items purchased including the items to be retrieved at the storage receptacle 104.

In on embodiment, the customer can complete a transaction of purchasing one or more items at the POS terminal. The items can include an item which is to be retrieved at the storage receptacle 104. The POS terminal can generate and issue a receipt for the transaction which can include an optical machine-readable element representing the order including the item to be retrieved from the storage receptacle 104. The POS terminal can transmit the receipt to the user device 141 and/or print the receipt. The customer an interface with the storage receptacle 104 using the optical machine-readable element generated by the POS terminal to retrieve the order.

Figure 2:
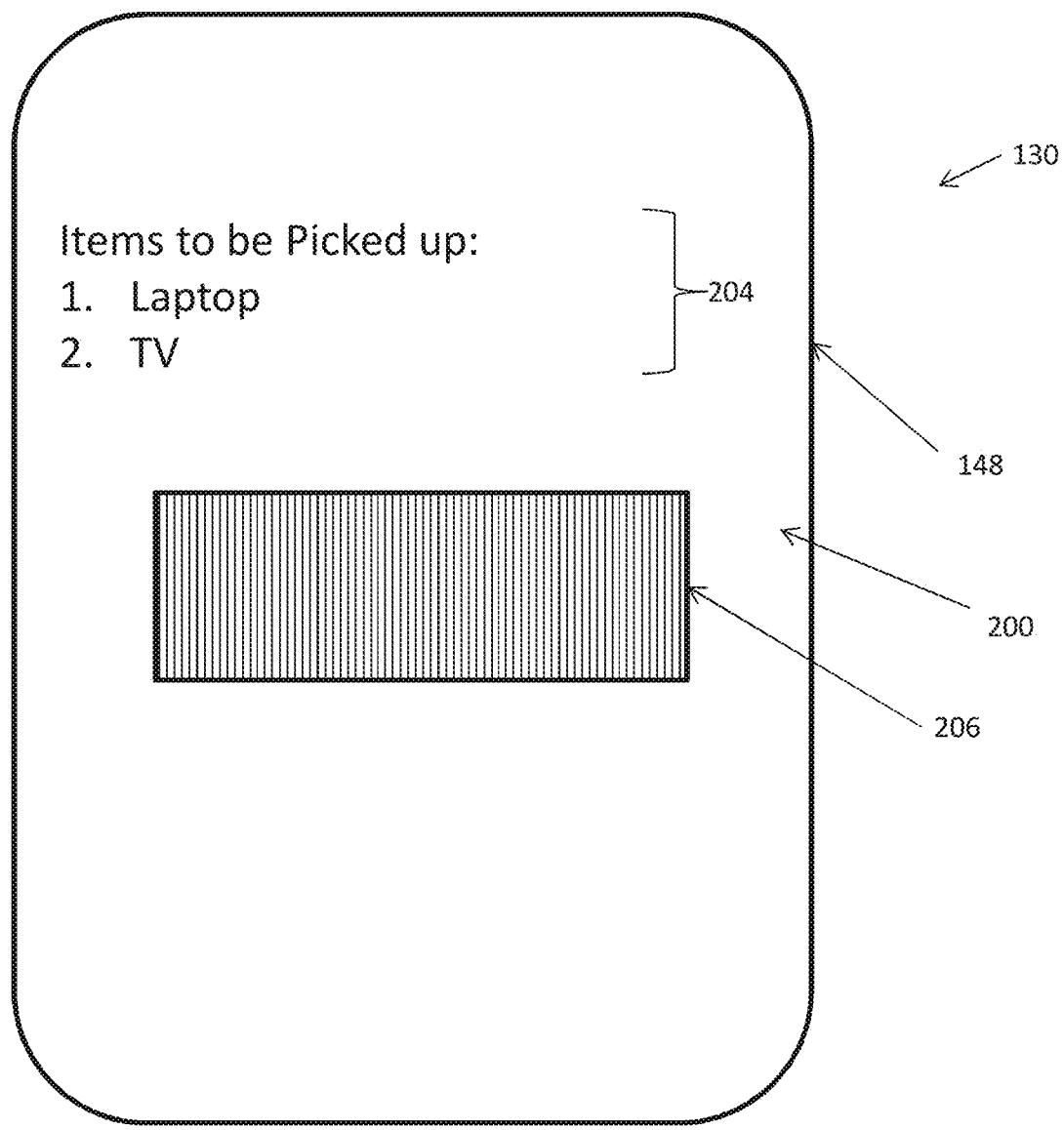
FIG. 2 depicts a mobile device in accordance with an exemplary embodiment.

FIG. 2 depicts a user interface 200 of an electronic device 130 in accordance with an exemplary embodiment. In one embodiment the electronic device 130. Electronic devices can be disposed throughout the facility and can be programmed to correspond with specific sections of the facility and/or specific physical objects in the facility. Execution of the second application by the electronic device can cause the electronic device to render a graphical user interface (GUI) on the interactive display 148. The electronic device 130 can receive input associated with one or more physical objects via the interactive display 148, a keypad/keyboard, or other input device. The input can be a request to retrieve the physical object at a storage receptacle located at a different location than the electronic device 130. The second application can render information 204 on the display 148 that is associated with physical objects to be retrieved. The second application can further generate and render a unique optical machine-readable element 206, such as a barcode or QR code, on the interactive display 148. The optical machine-readable element 206 can be encoded with an identifier for the physical objects to be retrieved. In one embodiment, a single optical machine-readable element 206 can be encoded with an identifier associated with each of the physical objects to be retrieved. In another embodiment, facility application can generate multiple optical machine readable elements 206 for each physical object to be retrieved. In yet another embodiment, the optical machine readable element 206 can be encoded with multiple identifiers of corresponding to each physical object to be retrieved.

Figure 3:
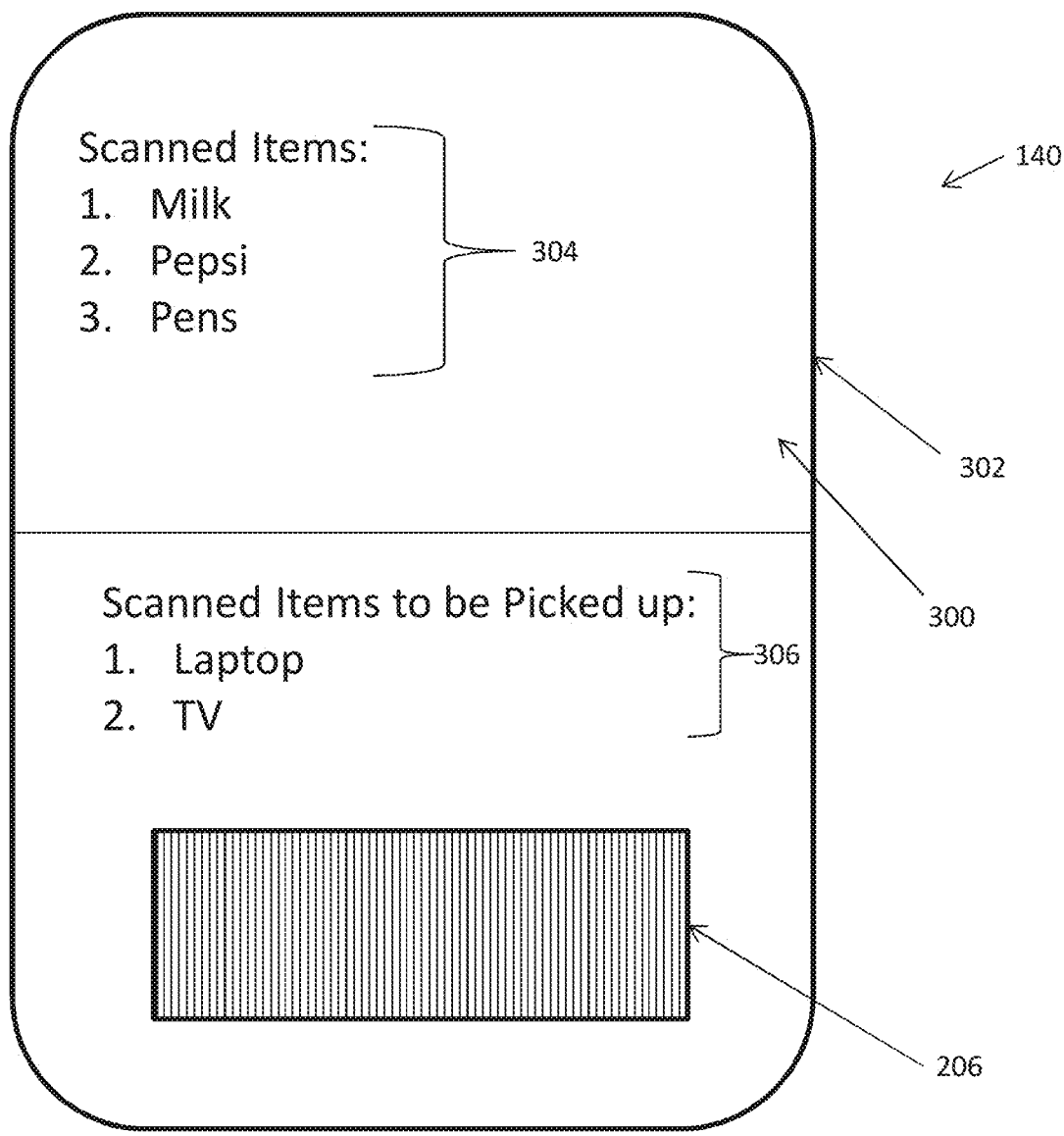
FIG. 3 depicts an electronic device in accordance with an exemplary embodiment.

FIG. 3 depicts a user interface 300 of the user device 141 in accordance with an exemplary embodiment. The user device 141 can execute a first application to render a graphical user interface (GUI) 300 on the display 302. The facility application can render information 204 associated with items that have already been retrieved and/or scanned by the user device 141.

The user device 141 can interface with the first application executing on the electronic device (e.g., electronic device 130 as shown in FIG. 2), using the second application, to request to retrieve physical objects from the storage receptacle. The user device 141 can receive the optical machine-readable element 206 associated with physical objects to be retrieved from a storage receptacle, from the electronic device 130 in response to interfacing with the electronic device 130. The second application can render the unique optical machine-readable element 206 on the interactive display 302. The facility application can further render information 306 associated with the physical objects to be retrieved from the storage receptacle on the interactive display 302.

Figure 4:
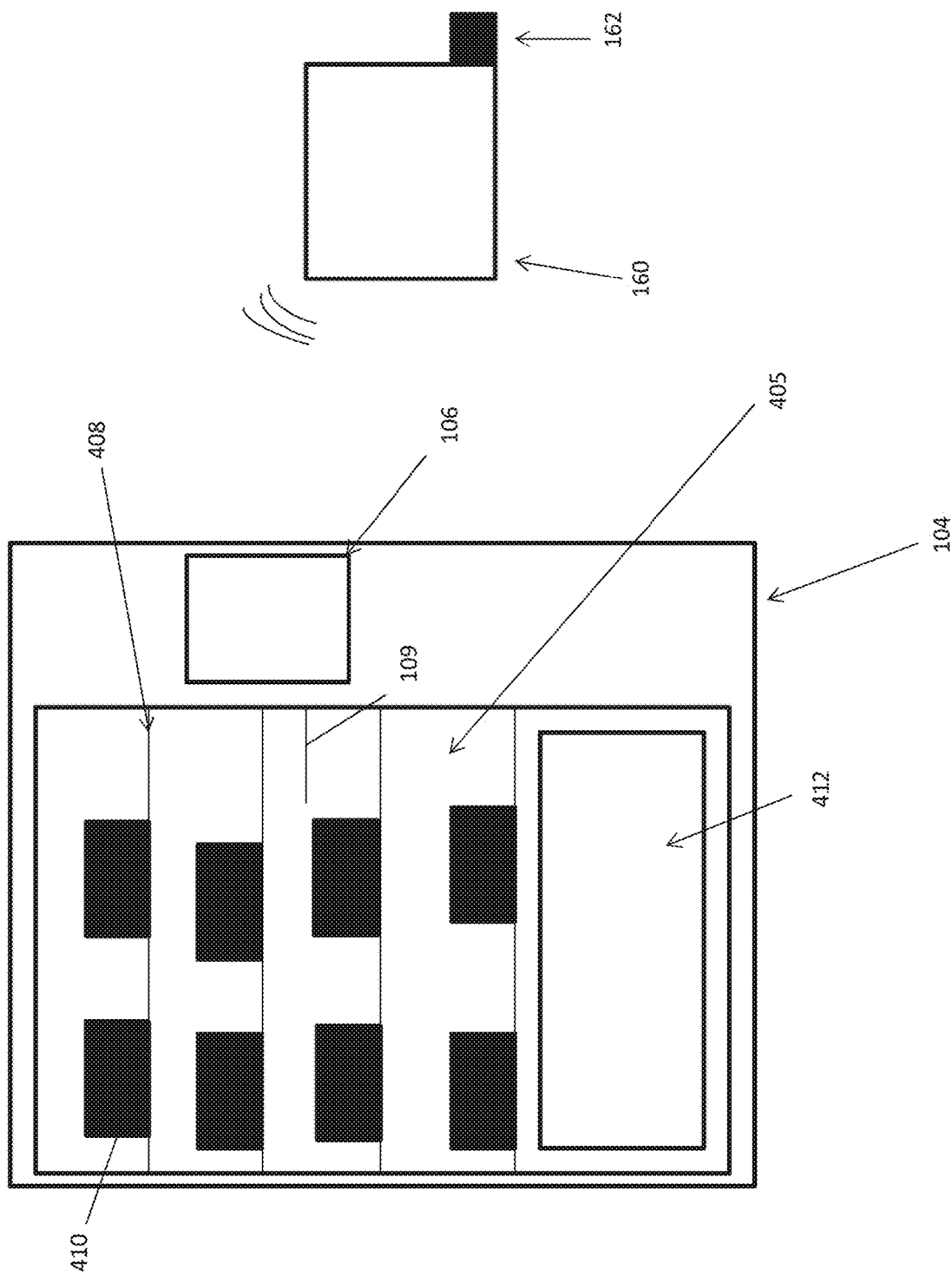
FIG. 4 depicts a user device in accordance with an exemplary embodiment.

FIG. 4 depicts a terminal 160 disposed with respect to a storage receptacle 104 in accordance with an exemplary embodiment. In one embodiment, terminals 160 and storage receptacles 104 can be disposed throughout a facility. A terminal 160 can include an input device 162. As an example, the input device 162 can be one or more or a combination of: a keypad, keyboard, optical scanner, or a touch-sensitive display.

The storage receptacle 104 can include an interior volume 405, an input device 106, shelving units 408, a dispensing mechanism 109, and an opening 412. The shelving units 408 can hold and support one or more physical objects 410 within the interior volume 405. The opening 412 can provide access to the interior volume. The dispensing mechanism 109 can transport and dispense one or more physical objects 410 through the opening 112. The input device 106 can receive input associated with physical objects 410 to be retrieved and dispensed.

In one embodiment, the terminal 160 can receive input from the input device 162 associated with one or more physical objects 410 to be retrieved from the storage receptacle 104. The terminal 160 can communicate with the storage receptacle 104 to authorize the storage receptacle 104 to dispense the one or more physical objects 410 to be dispensed. The storage receptacle 104 can receive input using the input device 106. The input can be associated with the physical objects to be retrieved from the storage receptacle 104. The storage receptacle 104 can confirm the one or more physical objects 410 are in fact being stored in the storage receptacle 104. The storage receptacle 104 can control the dispensing mechanism 109 to pick-up the one or more physical objects 410 from the shelving units 408, transport the one or more physical objects 410, and dispense the one or more physical objects 410 through the opening 412.

In one embodiment, the storage receptacle 104 can be embodied as a storage tower. The storage tower can include a housing having a base coupled to side walls or surfaces extending from the base. In the present example, the side walls or surfaces of the storage tower can form octagonal cylinder or column such that there are eight side walls or surfaces.

Figure 5:
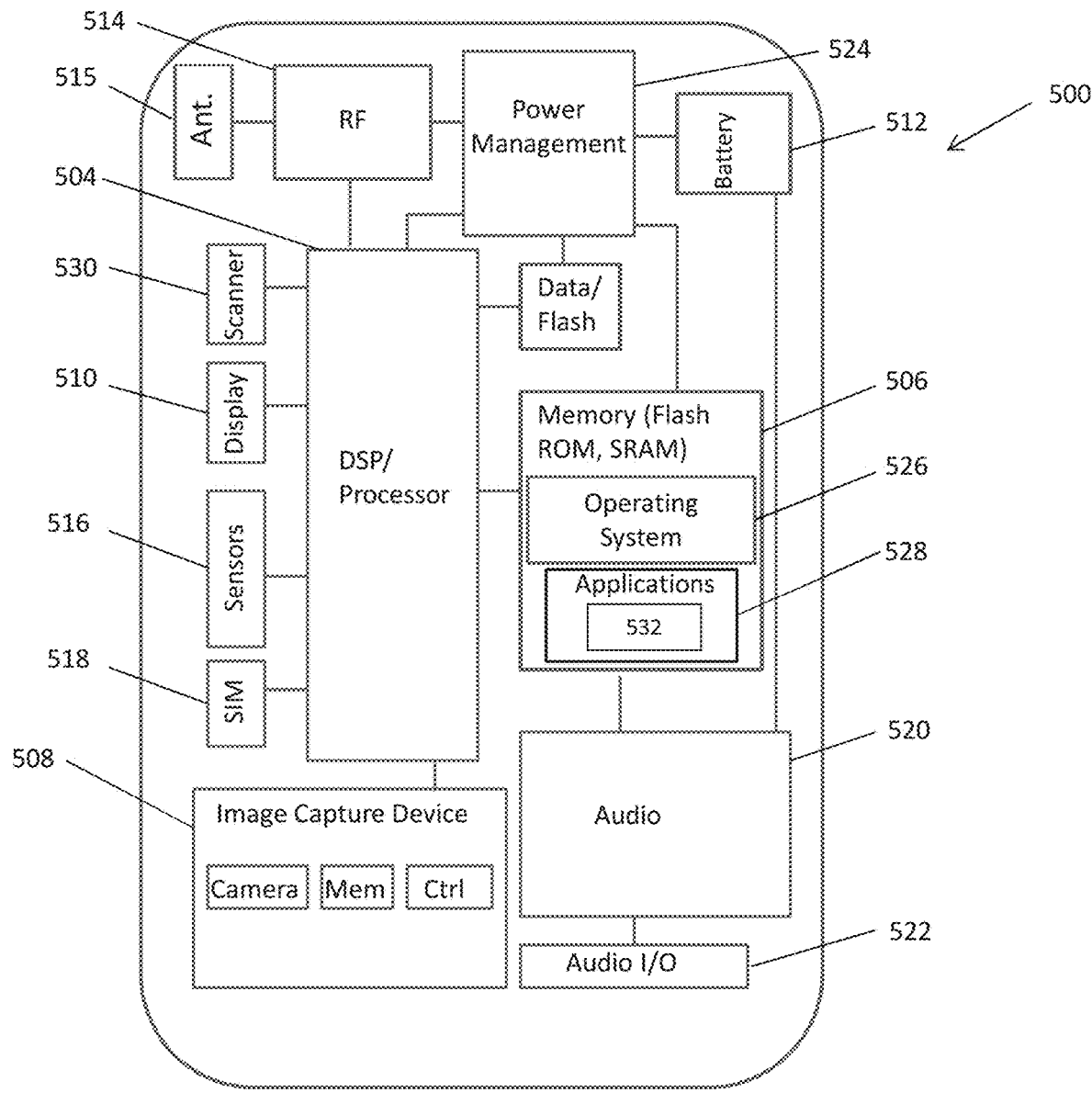
FIG. 5 depicts a terminal disposed with respect to a storage receptacle in accordance with an exemplary embodiment.

FIG. 5 depicts a mobile device 500 in accordance with an exemplary embodiment. The mobile device 500 can embody the electronic device 130 and/or user device 141. The mobile device 500 can be a smartphone, tablet, subnotebook, laptop, personal digital assistant (PDA), handheld device, and/or any other suitable mobile device that can be programmed and/or configured to implement and/or interact with embodiments of the system via wireless communication. The mobile device 500 can include a processing device 504, such as a digital signal processor (DSP) or microprocessor, memory/storage 506 in the form a non-transitory computer-readable medium, an image capture device 508, a touch-sensitive display 510, a power source 512, a radio frequency transceiver 514 and a reader 530. Some embodiments of the mobile device 500 can also include other common components commonly, such as sensors 516, subscriber identity module (SIM) card 518, audio input/output components 520 and 522 (including e.g., one or more microphones and one or more speakers), and power management circuitry 524. The sensors 516 can include a location-based sensor 534, configured to determine the location of the mobile device 500.

The memory 506 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 526 and applications 528 can be embodied as computer-readable/executable program code stored on the non-transitory computer-readable memory 506 and implemented using any suitable, high or low level computing language and/or platform, such as, e.g., Java, C, C++, C#, assembly code, machine readable language, and the like. In some embodiments, the applications 528 can include applications 532 such as the first application executing on the user device and the second application executing on the electronic device, configured to interact with the microphone, a web browser application, a mobile application specifically coded to interface with one or more servers of embodiments of the system for data transfer in a distributed environment. While memory is depicted as a single component those skilled in the art will recognize that the memory can be formed from multiple components and that separate non-volatile and volatile memory devices can be used.

The processing device 504 can include any suitable single- or multiple-core microprocessor of any suitable architecture that is capable of implementing and/or facilitating an operation of the mobile device 500. For example, a user can use the mobile device 500 in a facility to perform an image capture operation, capture a voice input of the user (e.g., via the microphone), transmit messages including a captured image and/or a voice input and receive messages from a remote computing system, display data/information including GUIs of the user interface 510, captured images, voice input transcribed as text, and the like. The mobile device 500 can perform the aforementioned operations using on an interne browser executing on the user device, or any web-based application. The processing device 504 can be programmed and/or configured to execute the operating system 526 and applications 528 to implement one or more processes and/or perform one or more operations. The processing device 504 can retrieve information/data from and store information/data to the storage device 506.

The RF transceiver 514 can be configured to transmit and/or receive wireless transmissions via an antenna 515. For example, the RF transceiver 514 can be configured to transmit data/information, such as input based on user interaction with the mobile device 500. The RF transceiver 514 can be configured to transmit and/or receive data/information having at a specified frequency and/or according to a specified sequence and/or packet arrangement.

The touch-sensitive display 510 can render user interfaces, such as graphical user interfaces to a user and in some embodiments can provide a mechanism that allows the user to interact with the GUIs. For example, a user may interact with the mobile device 500 through touch-sensitive display 510, which may be implemented as a liquid crystal touchscreen (or haptic) display, a light emitting diode touchscreen display, and/or any other suitable display device, which may display one or more user interfaces (e.g., GUIs) that may be provided in accordance with exemplary embodiments.

The power source 512 can be implemented as a battery or capacitive elements configured to store an electric charge and power the mobile device 500. In exemplary embodiments, the power source 512 can be a rechargeable power source, such as a battery or one or more capacitive elements configured to be recharged via a connection to an external power supply. The scanner 530 can be implemented as an optical reader configured to scan and decode machine-readable elements disposed on objects.

In one embodiment, the mobile device 500 can operate as an embodiment of the user devices or the electronic devices described herein. In one embodiment, the mobile device 500 can execute the application 532 so that the user device and/or electronic device can interface with one another. The user device can execute the first application and the electronic device can execute a second application. The first and second application can be programmed to facilitate communication and interaction between the user device and the electronic devices. The application 532 while executing on the user or electronic device can render a machine-readable element such as a barcode and/or QR code encoded with an identifier associated with one or more physical objects to be retrieved from a storage receptacle. The machine-readable element can be scanned at the storage receptacle.

Figure 6:
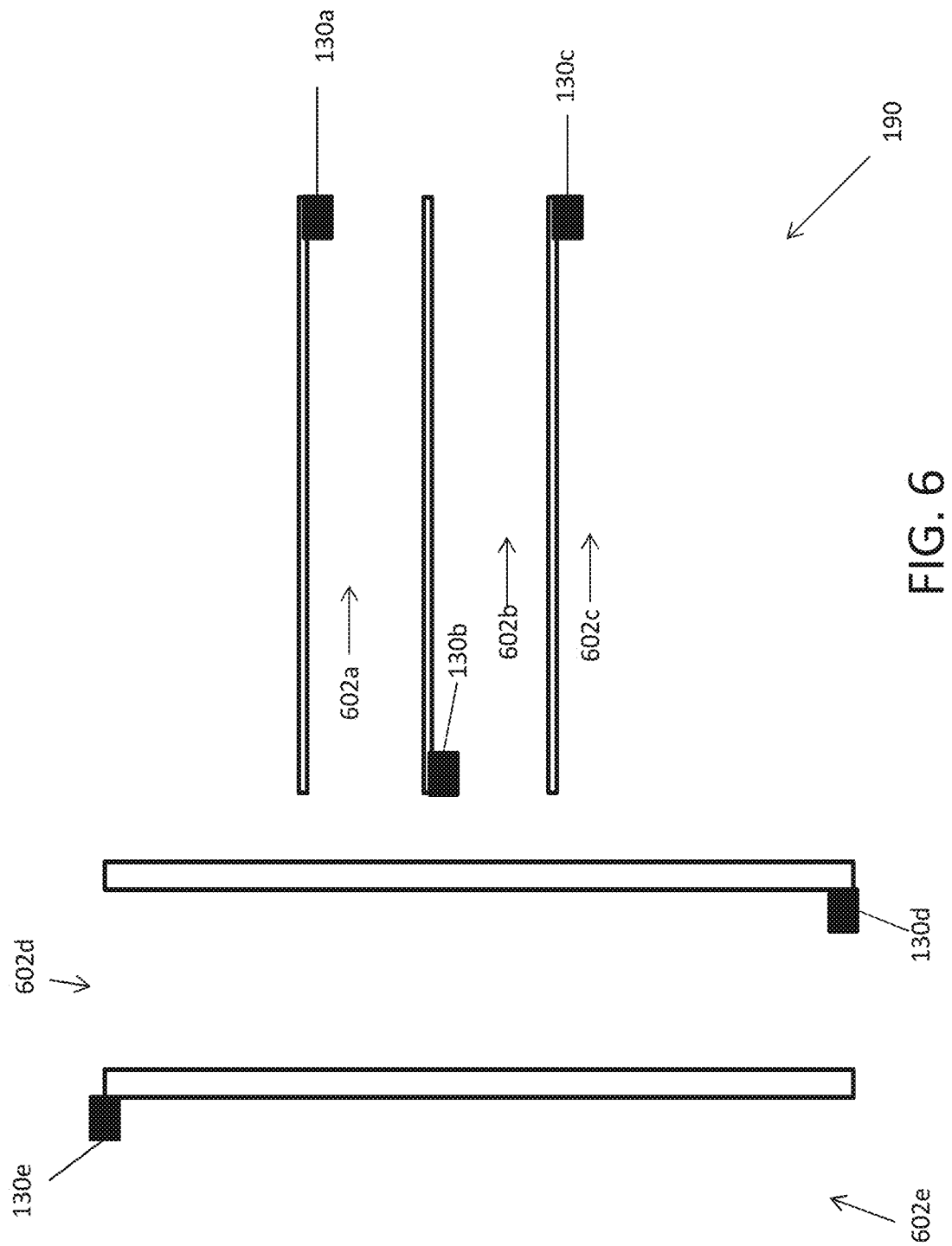
FIG. 6 is a block diagram illustrating an autonomous object storage and retrieval system in accordance with an exemplary embodiment.

FIG. 6 is a block diagram depicting a facility 600 including electronic devices 130*a-e* in accordance with an exemplary embodiment. In embodiment, electronic devices 130*a-e* can be disposed throughout a facility 600. Each electronic device can be disposed in, and associated with one of multiple sections 602*a-e* of the facility. For example, electronic device 104*a* can be disposed in section 602*a*, electronic device 130*b* can be disposed in section 602*b*, electronic device 130*c* can be disposed in section 102*c*, electronic device 130*d* can be disposed in section 602*d*, and electronic device 130*e* can be disposed in section 602*e*.

Each section 602*a-e* can be associated with different types of physical objects. For example, section 602*a* can be associated with furniture, while section 602*b* can be associated with electronics. Some physical objects can be disposed in the respective sections. However, some physical objects may only be available for retrieval at a storage receptacle in a different part of the facility. A user may interface with the electronic devices 130*a-e* in the sections 602*a-e*, using a mobile device and/or an interface of the electronic device, to receive an optical machine-readable element encoded with an identifier of one or more physical objects associated with the particular section, that are not disposed in the particular section and can be retrieved at the storage receptacle.

Figure 7:
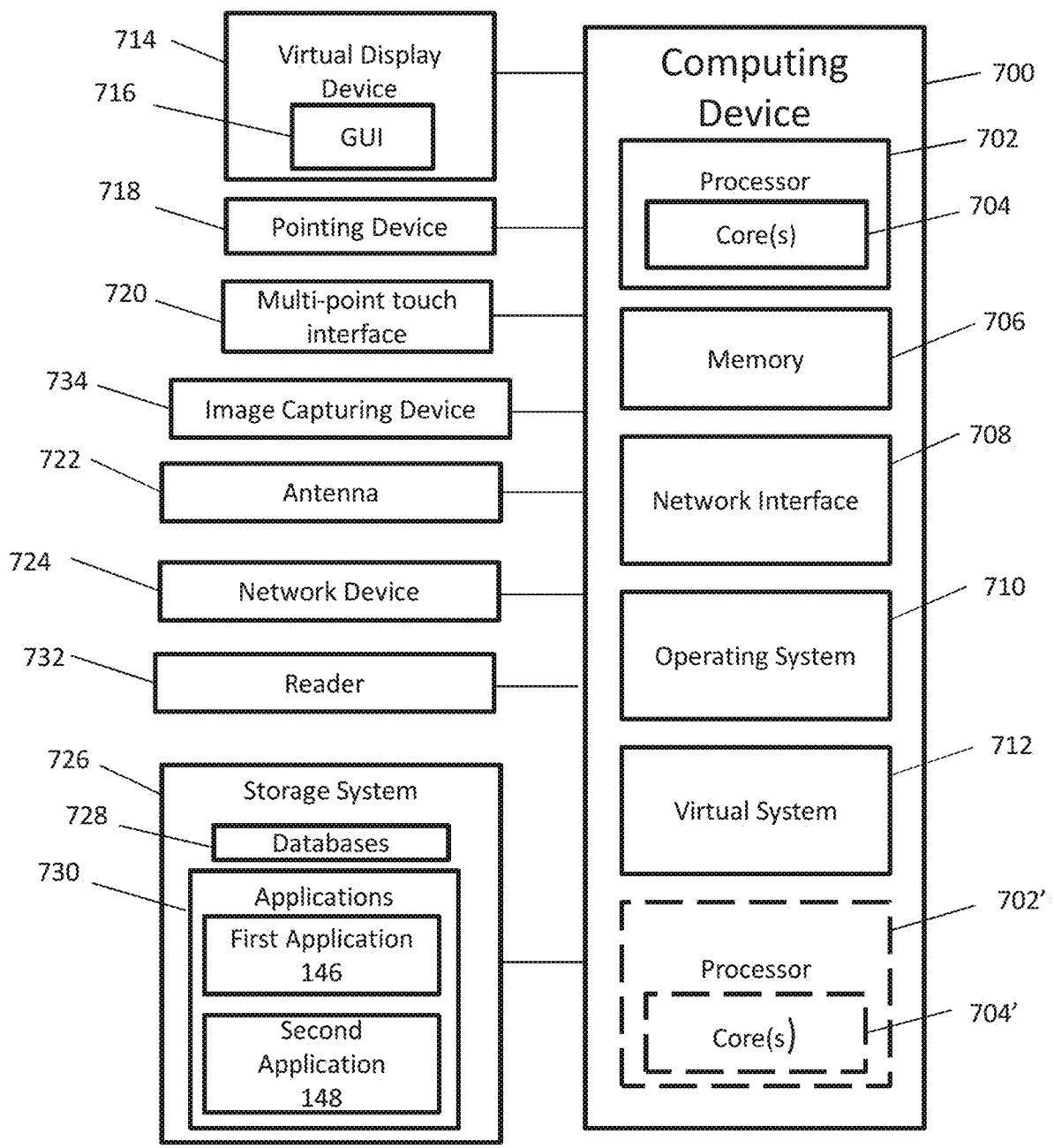
FIG. 7 is a block diagram illustrating of an exemplary computing device in accordance with an exemplary embodiment.

FIG. 7 is a block diagram of an example computing device for implementing exemplary embodiments of the present disclosure. The computing device 700 may be, but is not limited to, a smartphone, laptop, tablet, desktop computer, server or network appliance. The computing device 700 can be embodied as part of the local or remote computing system, electronic device, or terminal. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 706 included in the computing device 700 may store computer-readable and computer-executable instructions or software (e.g., applications 730 such as the facility application described herein with respect to FIG. 1) for implementing exemplary operations of the computing device 700. The computing device 700 also includes configurable and/or programmable processor 702 and associated core(s) 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for implementing exemplary embodiments of the present disclosure. Processor 702 and processor(s) 702' may each be a single core processor or multiple core (704 and 704') processor. Either or both of processor 702 and processor(s) 702' may be configured to execute one or more of the instructions described in connection with computing device 700.

Virtualization may be employed in the computing device 700 so that infrastructure and resources in the computing device 700 may be shared dynamically. A virtual machine 712 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 714, such as a computer monitor, which may display one or more graphical user interfaces 716, multi touch interface 720, a pointing device 718, an image capturing device 734 and a scanner 732.

The computing device 700 may also include one or more computer storage devices 726, such as a hard-drive, CD-ROM, or other computer readable media, for storing data and computer-readable instructions and/or software that implement exemplary embodiments of the present disclosure (e.g., applications). For example, exemplary storage device 726 can include one or more databases 728 for storing information regarding physical objects and the storage receptacles. The databases 728 may be updated manually or automatically at any suitable time to add, delete, and/or update one or more data items in the databases.

The computing device 700 can include a network interface 708 configured to interface via one or more network devices 724 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 722 to facilitate wireless communication (e.g., via the network interface) between the computing device 700 and a network and/or between the computing device 700 and other computing devices. The network interface 708 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

The computing device 700 may run any operating system 710, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 700 and performing the operations described herein. In exemplary embodiments, the operating system 710 may be run in native mode or emulated mode. In an exemplary embodiment, the operating system 710 may be run on one or more cloud machine instances.

Figure 8:
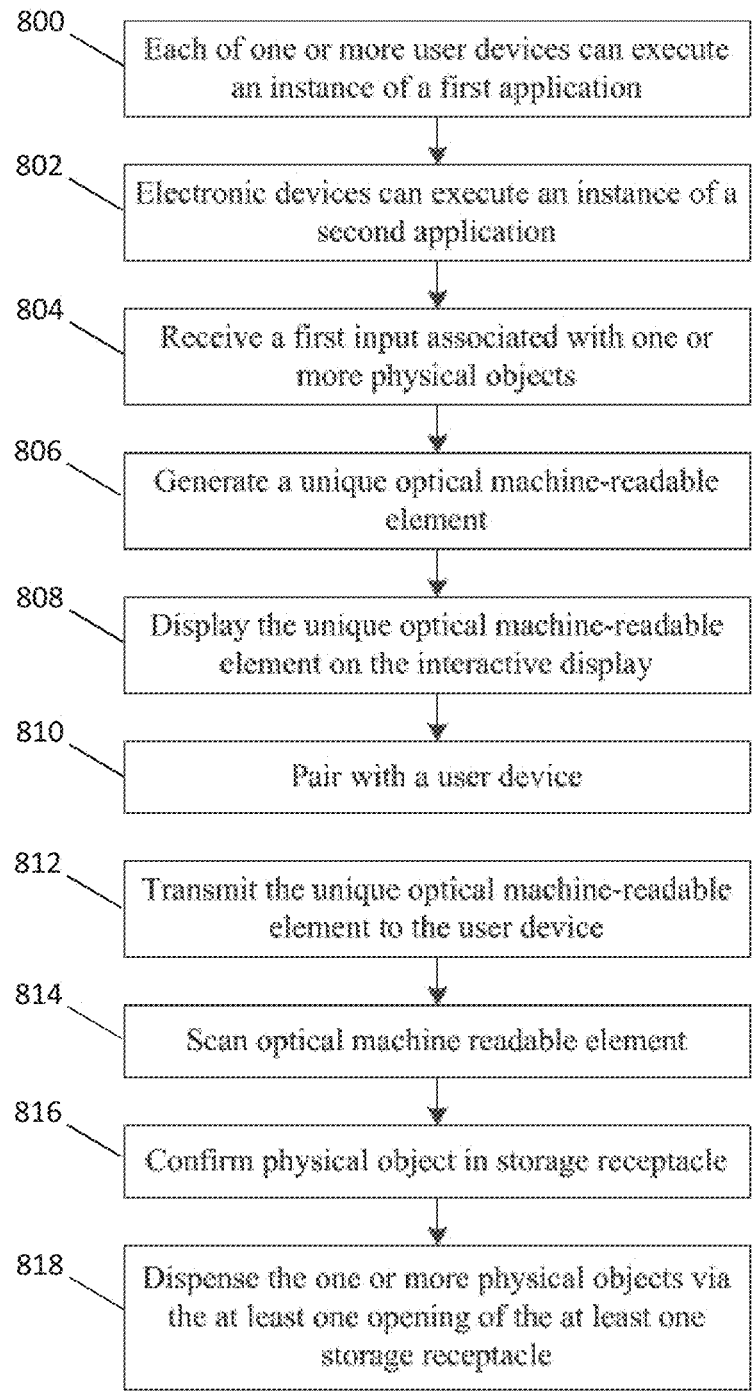
FIG. 8 is a flowchart illustrating an exemplary process in accordance with an exemplary embodiment.

FIG. 8 is a flowchart illustrating a process of the autonomous storage and retrieval system according to exemplary embodiment. In operation 800, each of one or more user devices (e.g., user devices 141 as shown in FIGS. 1 and 3) can execute an instance of a first application (e.g., first application 146 as shown in FIG. 1). In operation 802, electronic devices (e.g., electronic devices 130 and 130*a-e* as shown in FIGS. 1, 2, and 6) can execute an instance of a second application. The electronic devices can be disposed throughout a facility (e.g., facility 600 as shown in FIG. 6) and can include an interactive display (e.g., interactive display 148 as shown in FIGS. 1 and 2) and a communications interface (e.g., communications interface 112 as shown in FIG. 1).

In operation 804, an electronic device can receive a first input associated with one or more physical objects (e.g., physical objects 410 as shown in FIG. 4) normally stored in a section of the facility within a proximate distance of the electronic device, but which is now stored in the storage receptacle. In operation 806, the electronic device can generate a unique optical machine-readable element (e.g., optical machine-readable element 206 as shown in FIGS. 2-3) encoded with an identifier associated with the one or more physical objects. In operation 808, the electronic device can display the unique optical machine-readable element on the interactive display.

In operation 810, the electronic device can communicatively pair with a user device, via the application. In operation 812, the electronic device can transmit the unique optical machine-readable element to the user device. In operation 814, a storage receptacle (e.g., storage receptacle 104 as shown in FIGS. 1 and 4) disposed in the facility and including an input device, an interior volume, and at least one opening and configured to store physical objects, can scan the optical machine-readable element associated with the one or more physical objects, via the input device, rendered on the user device. In operation 816, the storage receptacle can confirm the one or more physical objects are stored within the interior volume of the storage receptacle. In operation 818, the storage receptacle can dispense the one or more physical objects via the at least one opening of the at least one storage receptacle.

Figure 9:
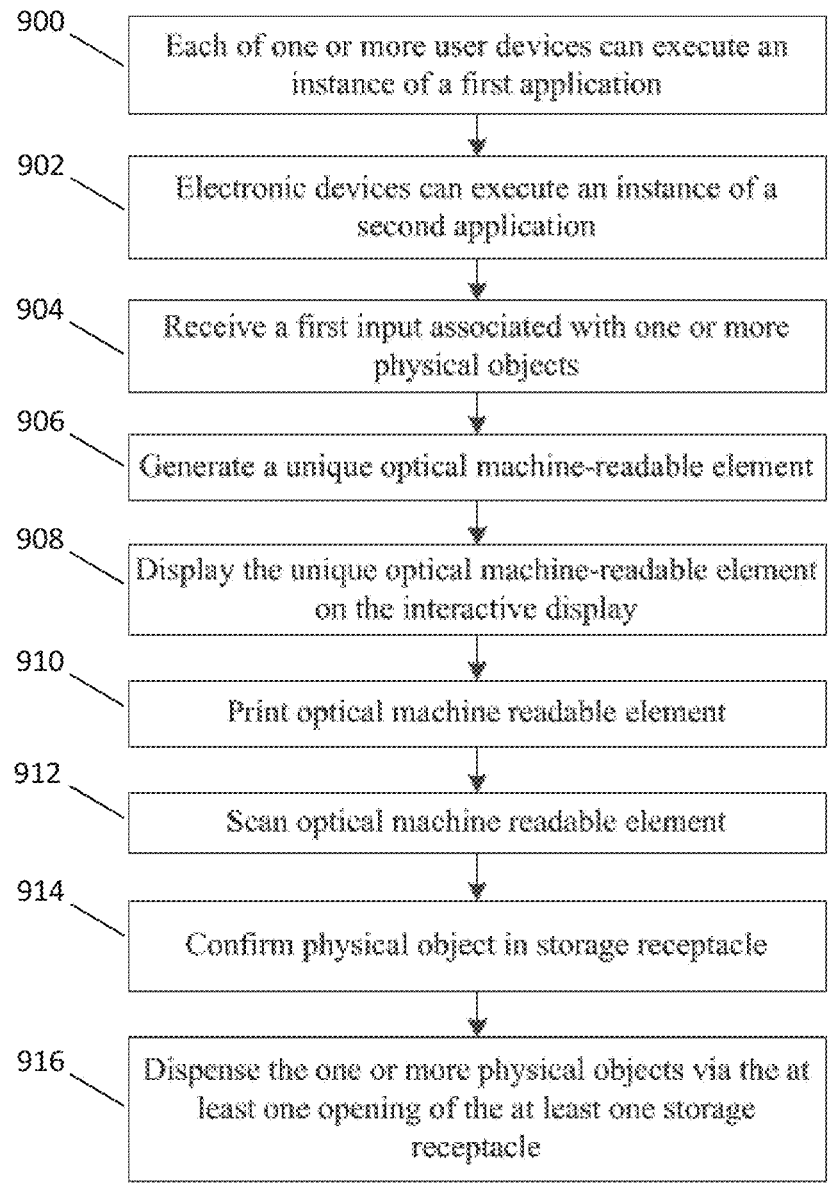
FIG. 9 is a flowchart illustrating a process of the autonomous storage and retrieval system according to exemplary embodiment.

FIG. 9 is a flowchart illustrating a process of the autonomous storage and retrieval system according to exemplary embodiment. In operation 900, each of one or more user devices (e.g., user devices 141 as shown in FIGS. 1 and 3) can execute an instance of a first application (e.g., first application 146 as shown in FIG. 1). In operation 902, electronic devices (e.g., electronic devices 130 and 130*a-e* as shown in FIGS. 1, 2, and 6) can execute an instance of a second application. The electronic devices can be disposed throughout a facility (e.g., facility 600 as shown in FIG. 6) and can include an interactive display (e.g., interactive display 148 as shown in FIGS. 1 and 2) and a communications interface (e.g., communications interface 112 as shown in FIG. 1).

In operation 904, an electronic device can receive a first input associated with one or more physical objects (e.g., physical objects 410 as shown in FIG. 4) normally stored in a section of the facility within a proximate distance of the electronic device, but which is now stored in the storage receptacle. In operation 906, the electronic device can generate a unique optical machine-readable element (e.g., optical machine-readable element 206 as shown in FIGS. 2-3) encoded with an identifier associated with the one or more physical objects. In operation 908, the electronic device can display the unique optical machine-readable element on the interactive display.

In operation 910, the electronic device can generate a print-out of the optical machine-readable element. In operation 912, a storage receptacle (e.g., storage receptacle 104 as shown in FIGS. 1 and 4) disposed in the facility and including an input device, an interior volume, and at least one opening and configured to store physical objects, can scan the optical machine-readable element associated with the one or more physical objects, via the input device, rendered on the print out. In operation 914, the storage receptacle can confirm the one or more physical objects are stored within the interior volume of the storage receptacle as described herein. In operation 916, the storage receptacle can dispense the one or more physical objects via the at least one opening of the at least one storage receptacle.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI is a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous storage and retrieval system comprising:
   a first electronic device disposed in a facility, the first electronic device including a communications interface, the first electronic device configured to:
   execute an instance of a first application configured to communicate with a second application executing on a second electronic device;
   receive a first input corresponding to one or more physical objects associated with the facility;
   generate a unique optical machine-readable element encoded with an identifier associated with the one or more physical objects; and
   transmit the unique optical machine-readable element to the second electronic device; and
   a storage receptacle, the storage receptacle including an input device and at least one opening, the storage receptacle configured to store a plurality of physical objects and to:
   receive, using the input device, a second input from the second electronic device from which the one or more physical objects are identified; and
   cause the one or more physical objects to be available via the at least one opening of the storage receptacle.

2. The system of claim 1, wherein the first electronic device generates a print-out of the unique optical machine-readable element.

3. The system of claim 1, wherein the input device is an optical scanner configured to scan and decode the unique optical machine-readable element rendered on a display of the second electronic device.

4. The system of claim 1, wherein the communications interface is a Near Field Communications (NFC) device.

5. The system of claim 1, wherein a plurality of electronic devices are disposed in the facility, the plurality of electronic devices include the first electronic device, each of the plurality of electronic devices are associated with a different section of the facility.

6. The system of claim 1, further comprising a terminal disposed in the facility and in communication with the storage receptacle.

7. The system of claim 6, wherein the terminal is configured to:
   receive a third input from the second electronic device including the unique optical machine-readable element encoded with the identifier associated with the one or more physical objects;
   determine the one or more physical objects are disposed in the storage receptacle; and
   transmit an authorization to dispense the one or more physical objects to the storage receptacle.

8. The system of claim 6, wherein the terminal is configured to:
   receive identifiers associated with the one or more physical objects; and
   generate a new optical machine-readable element associated with the one or more physical objects.

9. The system of claim 1, further comprising a local computing system associated with the facility and including a first database and a remote computing system including a second database.

10. The system of claim 9, wherein in response to transmitting the unique optical machine-readable element to the second electronic device, the first electronic device receives a fourth input associated with delivering the one or more physical objects to a specified location.

11. The system of claim 10, wherein in response to the first electronic device receiving the fourth input, the first electronic device is configured to generate a communications bridge between the first electronic device and the remote computing system.

12. The system of claim 11, wherein the remote computing system is configured to update the second database.

13. The system of claim 9, wherein in response to dispensing of the one or more physical objects the local computing system is configured to update the first database.

14. An autonomous storage and retrieval method comprising:
   executing, via a first electronic device disposed in a facility, the first electronic device including an interactive display and a communications interface, an instance of a first application configured to communicate with a second application executing on a second electronic device;

receiving, via the first electronic device, a first input corresponding to one or more physical objects associated with the facility;

generating, via the first electronic device, a unique optical machine-readable element encoded with an identifier associated with the one or more physical objects; and transmitting, via the first electronic device, the unique optical machine-readable element to the second electronic device;

receiving, via a storage receptacle including an input device and at least one opening, the storage receptacle configured to store a plurality of physical objects using the input device, a second input from the second electronic device from which the one or more physical objects are identified; and causing, via the storage receptacle, the one or more physical objects to be available via the at least one opening of the storage receptacle.

15. The method of claim 14, further comprising generating, via the first electronic device, a print-out of the unique optical machine-readable element.

16. The method of claim 14, wherein the input device is an optical scanner configured to scan and decode the unique optical machine-readable element rendered on a display of the second electronic device.

17. The method of claim 14, wherein the communications interface is a Near Field Communications (NFC) device.

18. The method of claim 14, wherein a terminal is disposed in the facility and is in communication with the storage receptacle.

19. The method of claim 18, further comprising:

receiving, via the terminal, a third input from the second electronic device including the unique optical machine-readable element encoded with the identifier associated with the one or more physical objects;

determining, via the terminal, the one or more physical objects are disposed in the storage receptacle; and transmitting, via the terminal, an authorization to dispense the one or more physical objects to the storage receptacle.

20. The method of claim 18, further comprising:

receiving, via the terminal, identifiers associated with the one or more physical objects; and generating, via the terminal, a new optical machine-readable element associated with the one or more physical objects.

* * * * *